Figure 1:
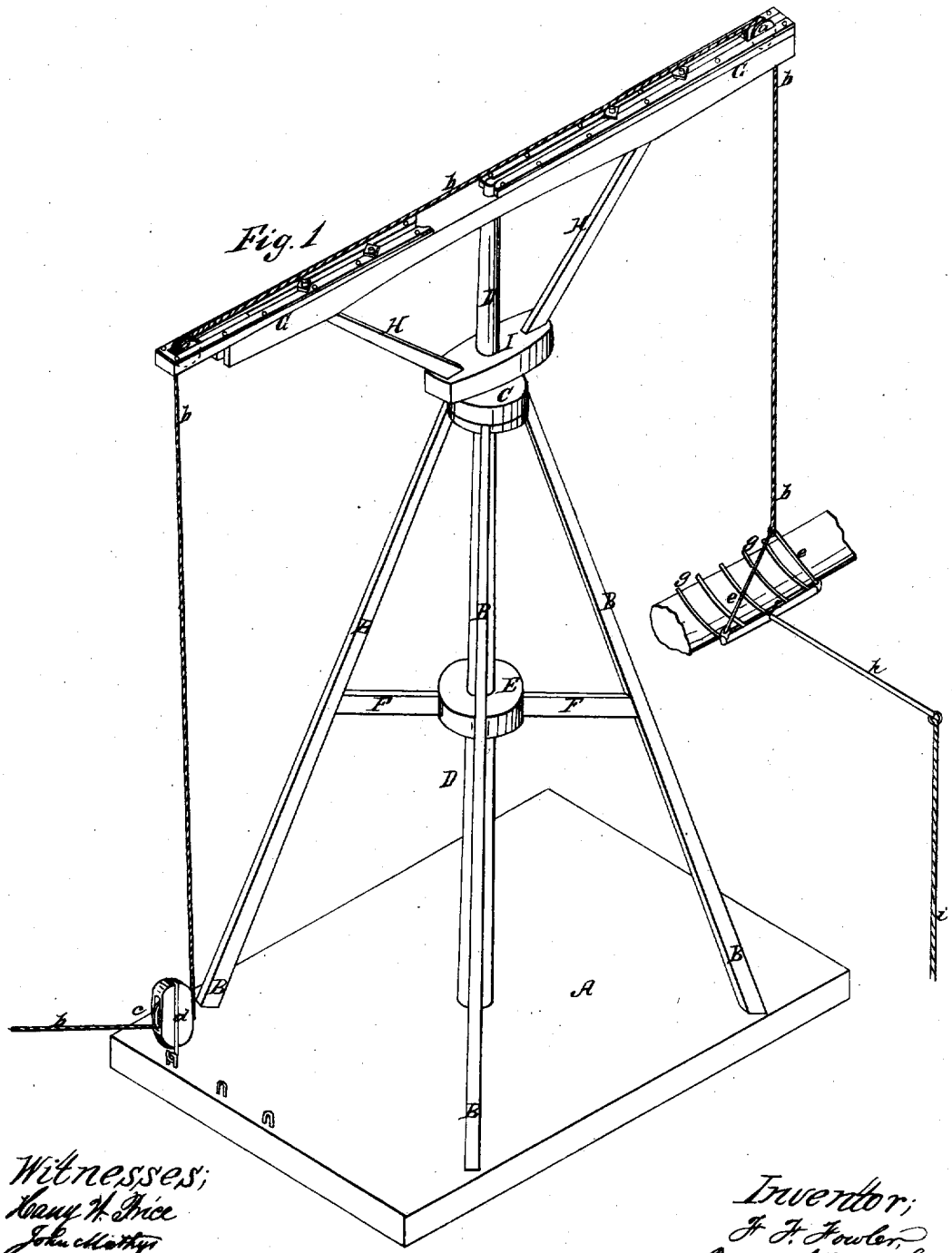

F. F. Fowler,

Derrick,

№ 1,870, Reissued Feb. 14, 1865.

Witnesses;
Harry H. Price
John Matthys

Inventor;
F. F. Fowler,
By atty A. B. Stoughton

AM. PHOTO-LITHO. CO. N.Y. (OSBORNE'S PROCESS)

UNITED STATES PATENT OFFICE.

F. F. FOWLER, OF CRANE TOWNSHIP, OHIO.

IMPROVEMENT IN HAY-ELEVATORS.

Specification forming part of Letters Patent No. 27,899, dated April 17, 1860; Reissue No. 1,341, dated September 9, 1862; Reissue No. 1,870, dated February 14, 1865.

DIVISION NO. 2.

*To all whom it may concern:*

Be it known that I, F. F. FOWLER, of Crane Township, county of Wyandotte and State of Ohio, have invented certain new and useful Improvements in Elevating Hay and other Like Products; and I do hereby declare that the following is a full, clear, and exact description of that part of my invention which relates to Division No. 2, reference being had to the accompanying drawings, making a part of this specification, in which—

The figure represents a perspective view of the machine in use.

This invention relates to a contrivance which is especially adapted for use on farms for the purpose of facilitating the stacking of hay and other similar products by admitting of the use of a horse to perform the most laborious part of the work.

By my invention I obtain a "labor-saving machine" which can be readily moved about from one place to another, and which will enable a person to stack hay in localities where such work would otherwise be exceedingly inconvenient and laborious.

I so construct a machine for the above-mentioned purpose that the same power which is employed to elevate a load of hay will also convey the load over the stack in a position to allow the attendant to deposit it thereon; and while this is the case I also provide for gathering the hay at any side of the machine and depositing it upon a stack, or erecting a stack at any other side of the machine, all as will be hereinafter described.

To enable others skilled in the art to make and use my invention, I will proceed to describe one form of machine by which my invention may be carried into effect.

In the accompanying drawings, A represents a platform or base which should be made of sufficient area to give steadiness and solidity to sustain the superstructure for elevating and moving the load of hay to be placed upon the stack. In the center of this base A is erected a perpendicular post, D, which is stayed or braced in a rigid position by the inclined stays B B, which are carried up to a point which is near the upper end of said post D.

G represents a horizontal jib or beam, which is pivoted in any suitable manner to the central post, D, so that it will turn completely round this post; or the beam or jib G may be secured rigidly to a central post which is susceptible of rotating. In this case the beam G may be sustained and strengthened by braces framed into it and to the turning post; but if the beam G turns around a fixed post, as I have represented, braces H H and collar I may be employed. At or near the extreme ends of the beam G are sheaves *a a*, over which pass a rope or chain, *b*, to one end of which is attached a fork, *h*, having a guy-rope, *i*, attached to its handle, as represented in Fig. 1. This hay-fork is constructed with tines *g* and balanced by the bail *e*, which is connected at its ends to the ends of the fork-head. This bail is the fulcrum of suspension of the fork, the tines being one arm of the lever and the handle the other. Thus the weight of the hay on the tines can be counterbalanced by the power applied to the handle by the attendant who holds the guy-rope *i* during the operation of elevating a load, as will be further described. The opposite end of the rope *b* is carried down and passed through the pulley-block *d*, and to this end of this rope a horse may be attached for elevating the hay, which is gathered on the fork at the opposite end of the rope.

The operation of my machine is as follows: The stack is built at one side of the pitcher, and the pulley-block or sheave *d* on the base A is attached at or near the center of the opposite side of the machine, and the hay to be elevated is deposited at either end of the pitcher. In the operation of elevating the hay the man who handles the fork draws upon it until the cross-top beam swings around and occupies a position parallel with the stack or rick and at right angles to the line of draft or at any required angle. He then plunges his fork into the hay, speaks to the horse to move on, steps back from the hay, and holds the guy-rope *i* in his hand and keeps it sufficiently tight to keep the load off the side of the stack and the beam or jib G in the same position occupied by it when the draft was applied. When the load is sufficiently elevated to pass freely over the stack, the person holding the guy-rope *i'* slackens his hold on it and allows the beam G, with its loaded fork, to swing around in a line with the line of draft, thus bringing the load over the stack, upon which it is now dropped by the operator releasing the rope *i*.

The operator can hold the beam G until the load of hay is elevated perpendicularly to a sufficient height to pass over the stack, or he can let the load of hay move toward the stack as it is being elevated. In either case the horse or power applied to elevate the load also moves it from the point where the fork receives it to the point where it is discharged.

It will be seen that during the operation of elevating a load of hay, which has been gathered on the tines of the fork the operator gradually resists the tendency of the beam G to assume a position in a line with the draft. In other words he pulls against the horse in so far as to enable him to control the movement of said beam, but not to prevent the load from being elevated. The operator can control the movements of the beam G so long as he retains his hold on the guy-rope *i*, and when a load has been deposited upon a stack he moves the beam G back again, and at the same time takes up the slack rope as the horse backs, so as to get hold of the fork to reload it.

In carrying out my invention the crane or contrivances for elevating the load upon a stack may be mounted upon wheels or rollers to facilitate its portability, but for light structures the wheels may be dispensed with.

I have described the ordinary form of hand-fork in order to show that such a fork may be conveniently used in conjunction with the supporting and elevating contrivances, but I do not desire to confine my invention to such a fork, as others of a different construction may be used if desired.

By my invention it will be seen that the attendant can build up a stack of hay or other like product without much expenditure of labor on his part, the horse being compelled to do the greater part of the work. The beam which sustains the load while it is being elevated also serves as a lever to enable the horse or power applied to elevate this load to move the load to the position for dropping it without the horse stopping or changing the line of draft.

The tendency of the beam G during the operation of elevating a load is to assume a position in a line with the line of draft, from which it was moved at the commencement of the operation to load the fork.

Having thus described my invention, what I claim as new, and desire to secure by Letters Patent, is—

1. So constructing a machine for elevating hay or other like products that the same power employed in elevating said product will also revolve the top of the machine while the load is being elevated, or when high enough to pass over the top of the stack, and so that it may be raised from either or any side of the machine and deposited on the stack at any other side and wherever desired, substantially as described.

2. An elevator or crane when constructed as herein described, in combination with a device for grasping hay or other like product and depositing it upon a stack, substantially as described.

F. F. FOWLER.

In presence of—
W. H. KIRBY,
A. W. BRINKERHOFF.